(12) United States Patent
Sekiguchi et al.

(10) Patent No.: US 11,794,274 B2
(45) Date of Patent: Oct. 24, 2023

(54) DISSIMILAR METAL WELDING METHOD (71) Applicants: TOYOTA JIDOSHA KABUSHIKI KAISHA, Toyota (JP); KAWASAKI JUKOGYO KABUSHIKI KAISHA, Kobe (JP)

(72) Inventors: Takao Sekiguchi, Kariya (JP); Yoshitaka Muramatsu, Akashi (JP); Takuya Fukuda, Kakowgawa (JP)

(73) Assignees: TOYOTA JIDOSHA KABUSHIKI KAISHA, Toyota (JP); KAWASAKI JUKOGYO KABUSHIKI KAISHA, Kobe (JP)

( * ) Notice: Subject to any disclaimer, the term of this patent is extended or adjusted under 35 U.S.C. 154(b) by 149 days.

(21) Appl. No.: 17/429,166

(22) PCT Filed: Feb. 5, 2020

(86) PCT No.: PCT/IB2020/000031
§ 371 (c)(1),
(2) Date: Aug. 6, 2021

(87) PCT Pub. No.: WO2020/161541
PCT Pub. Date: Aug. 13, 2020

(65) Prior Publication Data
US 2022/0105589 A1 Apr. 7, 2022

(30) Foreign Application Priority Data
Feb. 8, 2019 (JP) .................................. 2019-021369

(51) Int. Cl.
*B23K 20/00* (2006.01)
*B23K 20/12* (2006.01)
*B23K 20/227* (2006.01)
*B23K 103/20* (2006.01)

(52) U.S. Cl.
CPC .......... *B23K 20/125* (2013.01); *B23K 20/126* (2013.01); *B23K 20/1265* (2013.01); *B23K 20/2275* (2013.01); *B23K 2103/20* (2018.08)

(58) Field of Classification Search
CPC ............ B23K 20/1265; B23K 20/1255; B23K 20/122; B23K 20/126; B23K 20/123; B23K 20/125
See application file for complete search history.

(56) References Cited

U.S. PATENT DOCUMENTS 9,302,343 B2 * 4/2016 Kumagai ............. B23K 20/126
10,201,873 B2 * 2/2019 Okada .................. B23K 20/124
(Continued)

FOREIGN PATENT DOCUMENTS

EP 1716959 A2 11/2006
JP 2006-061921 A 3/2006
(Continued)

OTHER PUBLICATIONS

International Search Report for PCT/IB2020/000031 dated Jun. 22, 2020.
(Continued)

*Primary Examiner* — Erin B Saad
(74) *Attorney, Agent, or Firm* — Sughrue Mion, PLLC (57) ABSTRACT

A dissimilar metal welding method includes a preparing step and a working step. In the preparing step, a pin member is moved to a second metal material while being rotated, and a tool body is driven such that the tool body is moved in a direction away from the second metal material while being rotated. In the working step, a through-hole is formed in the second metal material by the pin member, and then a distal end of the pin member is dug into the first metal material to a predetermined depth position in the first metal material.

2 Claims, 4 Drawing Sheets

(56) References Cited

U.S. PATENT DOCUMENTS

| | | | |
|---|---|---|---|
| 10,919,108 B2* | 2/2021 | Okada | B23K 20/126 |
| 11,045,898 B2* | 6/2021 | Haruna | B23K 20/122 |
| 11,292,076 B2* | 4/2022 | Fukuda | B23K 20/1255 |
| 11,292,077 B2* | 4/2022 | Haruna | B23K 20/1245 |
| 11,396,060 B2* | 7/2022 | Hirano | B23K 20/1225 |
| 2008/0029581 A1 | 2/2008 | Kumagai et al. | |
| 2014/0069985 A1* | 3/2014 | Okada | B23K 20/122 228/2.1 |
| 2015/0183053 A1 | 7/2015 | Kumagai et al. | |
| 2015/0183054 A1 | 7/2015 | Okada | |
| 2018/0297145 A1* | 10/2018 | Ohashi | B23K 20/12 |
| 2018/0304401 A1* | 10/2018 | Ohashi | B23K 20/125 |

FOREIGN PATENT DOCUMENTS

| | | |
|---|---|---|
| JP | 2006-239720 A | 9/2006 |
| JP | 2007-98439 A | 4/2007 |
| JP | 2007-253172 A | 10/2007 |
| JP | 2010-269367 A | 12/2010 |
| JP | 2015-123488 A | 7/2015 |
| JP | 2018-020359 A | 2/2018 |
| KR | 10-2015-0034252 A | 4/2015 |

OTHER PUBLICATIONS

Zhenxue Jiao et al., "Advanced Manufacturing Technology", Beijing Institute of Technology Press, 1997, pp. 308-309 (4 pages total).

Daguo Yu, "Innovation of Deep Hole Processing and Inspection Technology", Defense Industry Press, 2016, pp. 6 (3 pages total).

Partial Translation of Office Action dated Jul. 13, 2022 issued by the Chinese Patent Office in Chinese Application No. 202080011518.9.

Daguo Yu, "Innovation of Deep Hole Machining and Testing Technology", Defense Industry Press, 2016, pp. 6 (3 pages total).

* cited by examiner

DISSIMILAR METAL WELDING METHOD

BACKGROUND OF THE INVENTION

1. Field of the Invention

The invention relates to a dissimilar metal welding method.

2. Description of Related Art

For example, Japanese Patent No. 4602796 discloses an invention related to a method of overlapping an aluminum plate material and a steel plate, rotating a probe coaxially positioned at a distal end of a shoulder member of a rotating tool that is rotated around an axis, to put the probe into the aluminum plate material side such that a distal end of the probe reaches a predetermined position directly above the steel plate, and performing spot welding of the aluminum plate material and the steel plate by friction stir.

In Japanese Patent No. 4602796, the distal end of the probe is moved downward to the predetermined position (10 μm or more, 20% or less of the thickness of the aluminum plate material) directly above the steel plate, and the friction stir is performed at the position. The shoulder member is moved downward, while the probe is moved upward, and thereby a probe hole generated by pulling of the probe is filled by flow of material. Thereby, the spot welding of the aluminum plate material and the steel plate is performed.

SUMMARY OF THE INVENTION

In Japanese Patent No. 4602796, the probe is put into the aluminum plate material, and the probe is stopped before the probe reaches the steel plate. If the timing when the downward movement of the probe is stopped is a time point when the amount of the downward movement of the probe becomes a predetermined value, the probe cannot be precisely stopped at the predetermined position directly above the steel plate when there are variations in plate thickness sizes of the aluminum plate material and the steel plate. In this respect, there is room for improvement.

The invention provides a dissimilar metal welding method that makes it possible to weld a first metal material and a second metal material with high quality, regardless of variations in plate thickness sizes of the first and second metal materials.

An aspect of the invention is a dissimilar metal welding method of overlapping a first metal material and a second metal material and performing friction stir spot welding of the first metal material and the second metal material, the second metal material being composed of a metal having a lower melting point than a melting point of a metal composing the first metal material, the dissimilar metal welding method including: a preparing step of causing a distal end surface of a pin member to abut against a predetermined position on a non-overlapping surface of the second metal material, by performing driving such that the distal end surface of the pin member is moved to the second metal material while the distal end surface of the pin member is rotated, the pin member being inserted into an inner hole of a cylindrical tool body in a rotatable and axially movable manner, the tool body being supported in a rotatable and axially movable manner; and a working step of continuing the rotation and movement of the pin member, and performing driving such that a distal end surface of the tool body is moved in a direction away from the second metal material while the tool body is rotated, in which in the working step, a through-hole is formed in the second metal material by the pin member, and then a distal end of the pin member is dug into the first metal material to a predetermined depth position in the first metal material.

In the working step, while the through-hole along the direction of the overlap is formed in the second metal material, it is possible to collect the metal plastically flowing due to the formation of the through-hole and the metal removed by the digging of the pin member into the first metal material, in an annular space formed by an outer circumference of the pin member, the distal end surface of the tool body, and an inner circumference of a support member that supports the tool body in a rotatable and axially movable manner.

With this configuration, when the pin member is dug into the first metal material, a newly formed surface of the first metal material is exposed, and solid phase welding of the metal plastically flowing to the newly formed surface and the metal removed by the digging is performed. Therefore, it is possible to weld the first metal material and the second metal material with high quality.

Moreover, the first metal material and the second metal material are dissimilar metals, and therefore, in the working step, there is clearly a difference between a load when the through-hole is formed in the second metal material by the pin member and a load when the pin member is dug into the first metal material.

The load is at least one of a drive load in a rotation direction of the pin member and a drive load in a movement direction of the pin member. Change in the load can be recognized by monitoring at least one of a change amount of electric current that is applied to a drive source (motor) for rotating the pin member and a change amount of electric current that is applied to a drive source (motor) for axially moving the pin member.

Thus, it is possible to stop the movements of the pin member and the tool body at a time point when it is detected that the pin member has been dug into the first metal material or a time point when a predetermined time has elapsed since the time point of the detection.

Thereby, even when there are variations in plate thickness sizes of the first and second metal materials, it is possible to manage the timing of the stop of the movements of the pin member and the tool body easily and precisely. As a result, it is possible to stably weld the first metal material and the second metal material with high quality, regardless of variations in plate thickness sizes of the first and second metal materials.

The above dissimilar metal welding method may be configured such that the movements of the pin member and the tool body are stopped when at least one of the change amount of the electric current that is applied to the drive source (motor) for rotating the pin member and the change amount of the electric current that is applied to the drive source (motor) for axially moving the pin member becomes larger than a predetermined threshold in the working step.

With this configuration, in the course of the formation of the through-hole in the second metal material by the pin member, it is possible to stop the movements of the pin member and the tool body, at a position when the distal end surface of the pin member has been dug into the first metal material to a predetermined amount.

That is, when the pin member is dug into the first metal material after the through-hole is formed in the second metal material by the pin member, the load of each drive source (motor) rapidly increases and the electric current that is applied to each drive source (motor) rapidly increases, compared to when the through-hole is formed in the second metal material.

Thereby, by checking the change in the electric current that is applied to at least one of both drive sources (motors), it is possible to recognize the digging of the pin member into the first metal material easily and precisely, and therefore it is possible to know the timing of the stop of the movements of the pin member and the tool body easily and precisely.

Thus, even when there are variations in plate thickness sizes of the first and second metal materials, it is possible to manage the digging amount of the pin member into the first metal material, that is, the working amount of the first metal material easily and precisely, regardless of the variations.

In addition, the above dissimilar metal welding method further includes a welding step of moving the pin member such that the pin member gets away from the first metal material and moving the tool body to the first metal material, after stopping the movement of the pin member and the tool body when at least one of the change amount of the electric current that is applied to the drive source (motor) for rotating the pin member and the change amount of the electric current that is applied to the drive source (motor) for axially moving the pin member becomes larger than a predetermined threshold in the working step.

In the welding step, in short, the plastically flowing metal and the metal removed by the digging of the pin member into the first metal material that are collected in the annular space in the working step are returned into the through-hole, and accordingly, solid phase welding of the second metal material that is the plastically flowing metal is performed to the dug site (newly formed surface) of the first metal material.

With the dissimilar metal welding method according to the invention, it is possible to weld the first metal material and the second metal material with high quality, regardless of variations in plate thickness sizes of the first and second metal materials.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

Hereinafter, a preferred embodiment for carrying out the invention will be described in detail with reference to the attached drawings.

Figure 6:
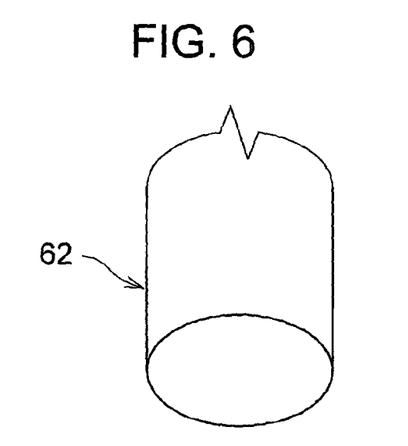
FIG. 6 is a perspective view showing the shape of a distal end (lower end) of a pin member.
Figure 7:
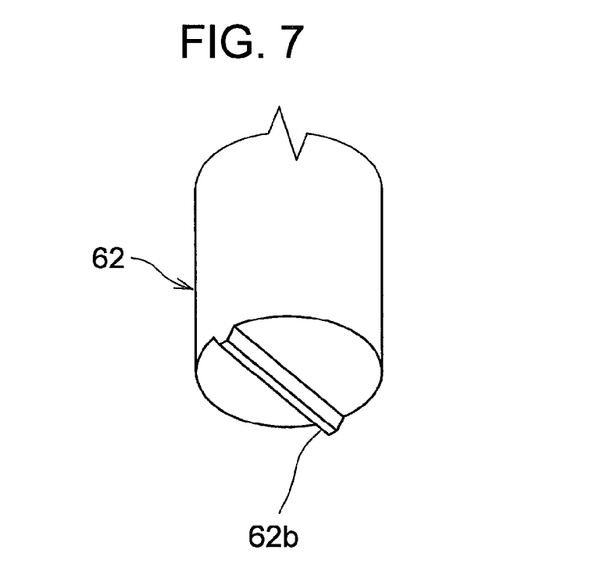
FIG. 7 is a perspective view showing another example of the shape of the distal end (lower end) of the pin member.
Figure 8:
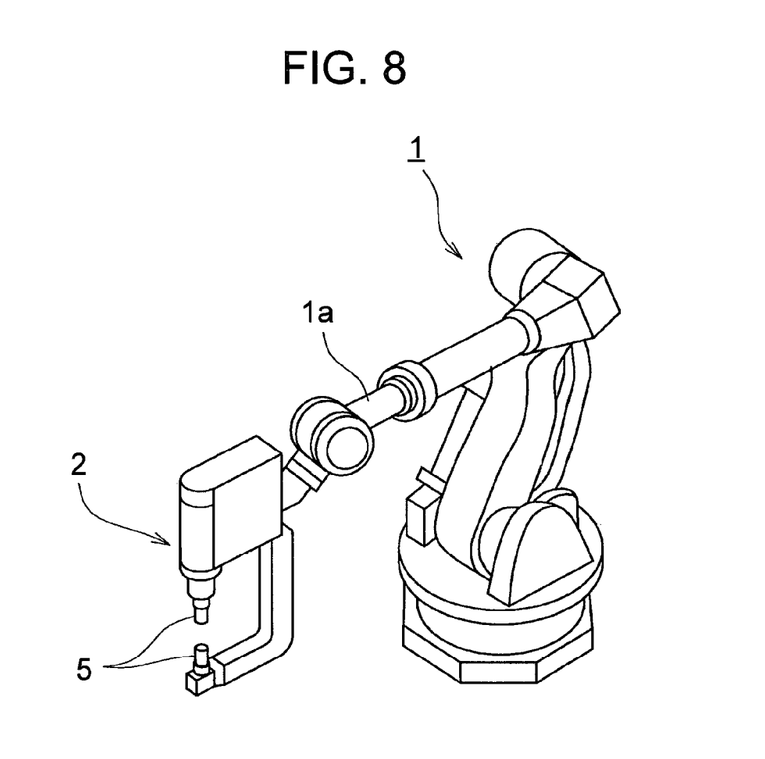
FIG. 8 is a perspective view showing the external appearance of a multi jointed robot that is equipped with the welding device in FIG. 1.

FIG. 1 to FIG. 8 show an embodiment of the invention. Before description of a welding device that executes a dissimilar metal welding method according to the invention, an example of use of the welding device will be described with FIG. 8. In FIG. 8, reference numeral 1 denotes a multi jointed robot, and reference numeral 2 denotes a welding device.

As shown in FIG. 8, the welding device 2 is equipped on a distal end of an arm 1a of the multi-jointed robot 1.

The welding device 2 is used for friction stir spot welding of a first metal material 3 and a second metal material 4 dissimilar to the first metal material 3, and includes a clamp 5, a working tool 6, a first drive unit 7, a second drive unit 8, a control unit 9, and the like.

For example, the first metal material 3 is a plate material made of steel (ferrous metal), and the second metal material 4 is a plate material made of an aluminum alloy having a lower melting point than that of the steel.

The combination of the first and second metal materials 3, 4 that are welding objects is not limited to the above combination, and the embodiment can be applied, for example, to the combination of steel and a magnesium alloy and the like, as long as there is a certain amount of difference between the melting point of the one metal material and the melting point of the other metal material.

The dissimilar metal welding method according to the embodiment can be applied not only to welding of plate materials but also to welding of various members including plate-like portions.

Figure 1:
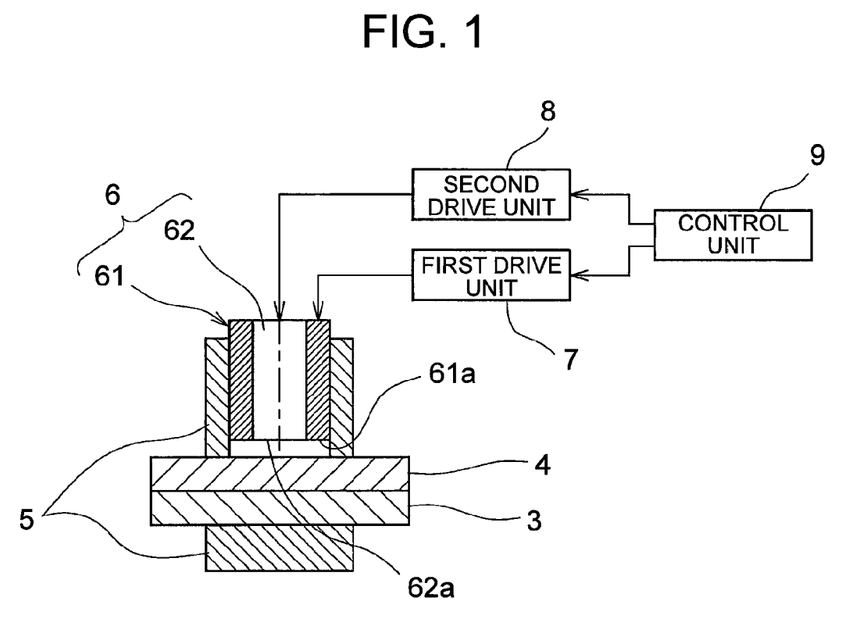
FIG. 1 is a schematic configuration diagram showing an embodiment of a welding device that executes a dissimilar metal welding method according to the invention, and shows a state where first and second metal materials are clamped.

The clamp 5 is attached to the distal end of the arm 1a of the multi jointed robot 1, and holds a workpiece in which the second metal material 4 having a plate shape is overlapped on the first metal material 3 having a plate shape, so as to nip the workpiece in the direction of the overlap.

The working tool 6 includes a tool body (also referred to as a shoulder) 61 and a pin member (also referred to as a probe) 62.

The tool body 61 has a cylindrical shape, for example, and is supported by an upper-side member (the reference numeral is omitted) of the clamp 5, so as to be rotatable around a central axis line of the tool body 61 and movable along the central axis line. In this way, the upper-side member (the reference numeral is omitted) of the clamp 5 functions as a support member that supports the tool body 61 in a rotatable and axially movable manner.

The pin member 62 has a column shape, for example, and is inserted into an inner hole of the tool body 61, so as to be rotatable around a central axis line of the pin member 62 and movable along the central axis line.

A distal end surface (lower end surface) 62a of the pin member 62 is a flat surface as shown in FIG. 6, for example, and may be formed such that a convex portion 62b is provided as shown in FIG. 7, for example.

The pin member 62 is formed of a superhard material that makes it possible to cut a surface oxide film naturally formed on the surface of the first metal material 3 and the first metal material 3 made of steel.

Although details are not illustrated, the first drive unit 7 includes a drive source (motor), a reducer and the like for rotating the tool body 61, and a drive source (motor), a dynamic power conversion mechanism and the like for moving the tool body 61 up and down.

Although details are not illustrated, the second drive unit 8 includes a drive source (motor), a reducer and the like for rotating the pin member 62, and a drive source (motor), a dynamic power conversion mechanism and the like for moving the pin member 62 up and down.

Figure 2:
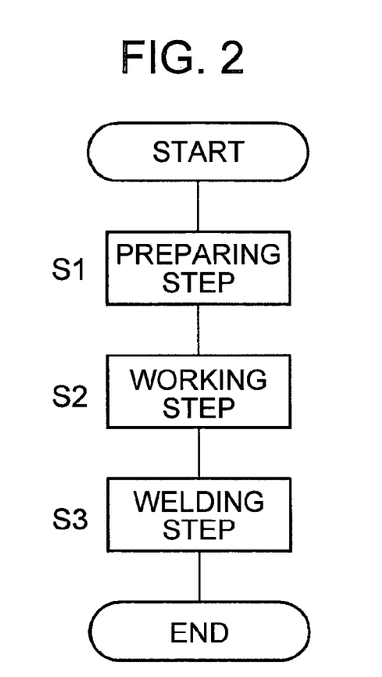
FIG. 2 is a diagram showing a flowchart for describing an outline of the dissimilar metal welding method that is executed by the welding device in FIG. 1.
Figure 3:
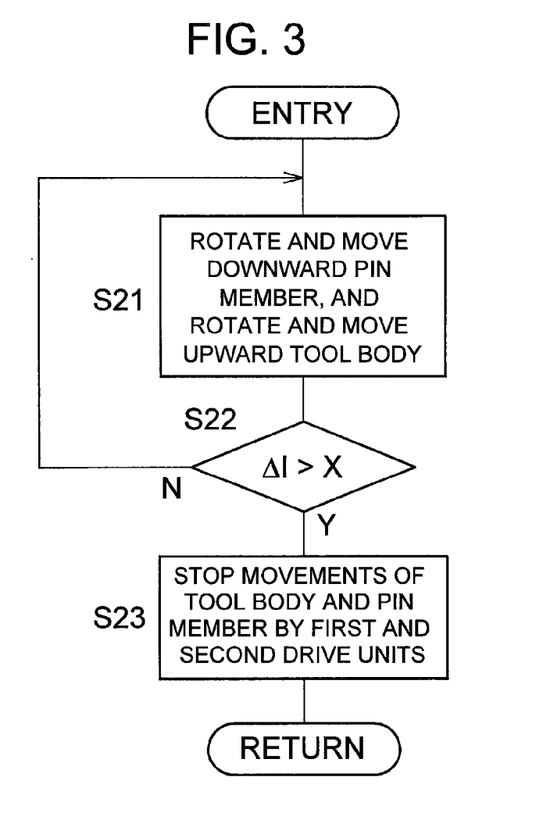
FIG. 3 is a diagram showing a flowchart for describing details of a working step in FIG. 2.

In response to a welding execution request, the control unit 9 executes a friction stir spot welding method by controlling the first and second drive units 7, 8 in accordance with flowcharts shown in FIG. 2 and FIG. 3.

The control unit 9 is a generally known electronic control unit (ECU), and includes a central processing device (central processing unit: CPU), a nonvolatile storage device (read-only memory: ROM), a temporary storage device (random-access memory: RAM), and the like.

In the ROM, various control programs, a map that is referred to at the time of execution of the various control programs, and the like are stored. The CPU executes operational processing based on the various control programs and map stored in the ROM. The RAM is a memory in which a result of the operation by the CPU, data input from sensors, and the like are temporarily stored.

Next, the friction stir spot welding method by the above-described welding device 2 will be described in detail.

As the friction stir spot welding method, the control unit 9 of the welding device 2 executes a preparing step in step S1, a working step in step S2, and a welding step in step S3, in this order, as shown in FIG. 2. After the welding step, the control unit 9 ends the flowchart shown in FIG. 2.

Specifically, in the preparing step, the first and second drive units 7, 8 drive and move the tool body 61 and the pin member 62 downward, while rotating the tool body 61 and the pin member 62 in a state where distal end surfaces (lower end surfaces) 61a, 62a of the tool body 61 and the pin member 62 are flush with each other. Thereby, both distal end surfaces 61a, 62a abut against a predetermined position on an upper surface (non-overlapping surface) of the second metal material 4 overlapped on the first metal material 3. In the embodiment, the direction of the rotation of the tool body 61 and the direction of the rotation of the pin member 62 are the same.

Incidentally, when the distal end surfaces (lower end surfaces) 61a, 62a of the tool body 61 and the pin member 62 abut against the upper surface of the second metal material 4, both the value of electric current that is applied to the drive source (motor) for rotating the pin member 62 in the second drive unit 8 and the value of electric current that is applied to the drive source (motor) for rotating the tool body 61 in the first drive unit 7 become larger than electric current values before the abutting. Thus, the control unit 9 can recognize the time point when the distal end surfaces (lower end surfaces) 61a, 62a abut, by monitoring at least one of the value of the electric current that is applied to the drive source (motor) for rotating the pin member 62 in the second drive unit 8 and the value of the electric current that is applied to the drive source (motor) for rotating the tool body 61 in the first drive unit 7.

It is detected that the distal end surface (lower end surface) 62a of the pin member 62 has abutted against the upper surface of the second metal material 4 in the preparing step. Thereafter, in the working step, the rotation and downward movement of the pin member 62 by the second drive unit 8 are continued. On the other hand, the tool body 61 is driven such that the downward movement of the tool body 61 is stopped once and the tool body 61 is moved upward, while the rotation of the tool body 61 by the first drive unit 7 is continued.

Figure 4:
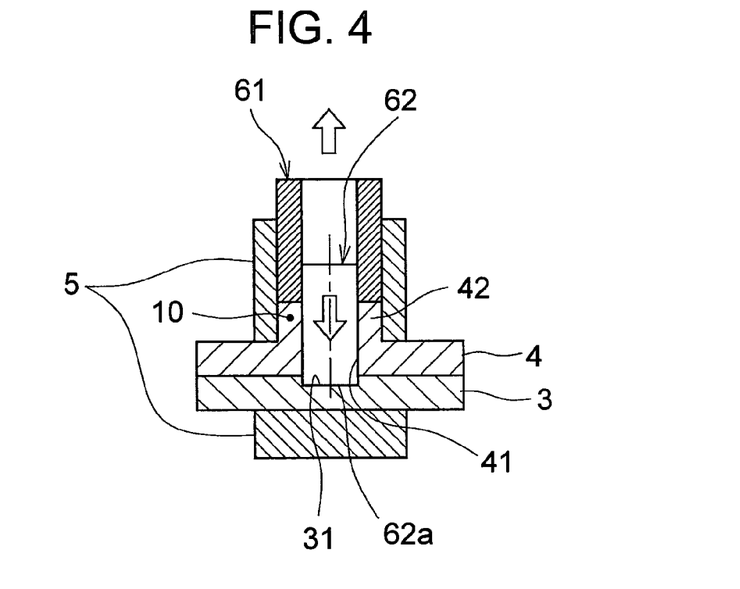
FIG. 4 is a diagram showing a manner of the working step.

Thereby, the second metal material 4 softens by friction heat generated by friction with the pin member 62 and a stir action of the pin member 62, and the second metal material 4 plastically flows. Thereby, as shown in FIG. 4, a through-hole 41 is formed in the second metal material 4, and a metal (also referred to as a plastically flowing metal, hereinafter) 42 that plastically flows is collected in an annular space 10 formed by an outer circumference of the pin member 62, the distal end surface (lower end surface) 61a of the tool body 61 and an inner circumference of the upper-side member (the reference numeral is omitted) of the clamp 5.

Then, the downward movement of the pin member 62 is continued until the distal end surface 62a of the pin member 62 is dug from an upper surface of the first metal material 3 to a predetermined depth. After the digging, the downward movement of the pin member 62 by the second drive unit 8 and the upward movement of the tool body 61 by the first drive unit 7 are stopped.

The digging can be realized by cutting of the first metal material 3 by the pin member 62. The digging amount may be an arbitrary amount, and may be set to 0.1 to 0.5 mm, for example. By the digging, a material at position of the predetermined depth from the surface of the first metal material 3 is exposed as a newly formed surface 31 (see FIG. 4). The newly formed surface 31 is a surface that is made of the original material of the first metal material 3 and on which no oxide film is formed.

Figure 5:
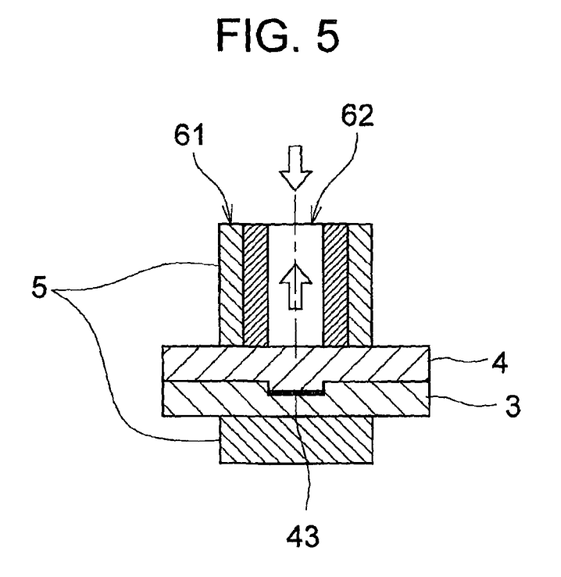
FIG. 5 is a diagram showing a manner of a welding step.

Furthermore, in the welding step, the pin member 62 is moved upward by the second drive unit 8 while being rotated, and the tool body 61 is moved downward by the first drive unit 7 while being rotated.

Thereby, the plastically flowing metal 42 and the metal removed by the digging that are collected in the annular space 10 are returned into the through-hole 41, and solid phase welding of the plastically flowing metal 42 of the second metal material 4 is performed to the newly formed surface 31 (see FIG. 4) of the first metal material 3, as shown in FIG. 5. In FIG. 5, the solid phase welding portion is shown as a thick line, and is denoted by reference numeral 43.

Next, details of the above-described working step will be described with reference to a flowchart shown in FIG. 3.

After the transition from the preparing step to the working step, first, in step S21, the rotation and downward movement of the pin member 62 by the second drive unit 8 are continued. Further, the tool body 61 is driven such that the downward movement of the tool body 61 is stopped once and the tool body 61 is moved upward, while the rotation of the tool body 61 by the first drive unit 7 is continued.

Then, in step S22, the timing of the stop of the downward movement of the pin member 62 and the upward movement of the tool body 61 is monitored.

Specifically, in step S22, it is determined whether a change amount $\Delta I$ of the electric current that is applied to at least one of the drive source (motor) for rotating the pin member 62 in the second drive unit 8 and the drive source (motor) for moving the pin member 62 up and down in the second drive unit 8 is larger than a predetermined threshold X.

In the case where the determination of $\Delta I \leq X$ is made in step S22, the process returns to step S21.

On the other hand, in the case where it is determined that $\Delta I > X$ is satisfied in step S22, the downward movement of the pin member 62 is stopped by the second drive unit 8, and the upward movement of the tool body 61 is stopped by the first drive unit 7, in the subsequent step S23. After step S23, the process breaks out of the flowchart shown in FIG. 3, and transitions (returns) to step S3 in FIG. 2.

In the working step, when the pin member 62 is dug into the first metal material 3 after the through-hole 41 is formed in the second metal material 4 by the pin member 62, the load of the drive source (motor) for rotating the pin member 62 and the load of the drive source (motor) for moving the pin member 62 up and down rapidly increase, compared to the loads when the second metal material 4 is worked, and the change amounts of the electric currents that are applied to the drive sources (motors) rapidly increase.

In view of this phenomenon, in step S22, it is determined whether the phenomenon of the rapid increase in the electric current that is applied to the drive source (motor) for rotating the pin member 62 and the electric current that is applied to the drive source (motor) for moving the pin member 62 up and down has occurred.

By such a determination method, it is possible to stop the downward movement of the pin member 62 and the upward movement of the tool body 61, at an early stage of the digging of the pin member 62 into the first metal material 3.

In this way, in the working step, it is possible to know the timing of the stop of the downward movement of the pin member 62 and the upward movement of the tool body 61 easily and precisely, and therefore it is possible to manage the digging amount of the pin member 62 into the first metal material 3 easily and precisely, such that the digging amount falls within a predetermined range.

In the above friction stir spot welding method, it is possible to manage rotation speeds and up-down speeds of the tool body 61 and the pin member 62 in the first and second drive units 7, 8, based on adjustment values previously set by the control unit 9.

As described above, with the embodiment to which the invention is applied, it is possible to weld the first metal material 3 and the second metal material 4 composed of the metal having a lower melting point than that of the metal composing the first metal material 3, with high quality.

Moreover, with the above embodiment, even when there are variations in plate thickness sizes of the first and second metal materials 3, 4, it is possible to manage the digging amount of the pin member 62 into the first metal material 3, that is, the working amount of the first metal material 3, in the working step, easily and precisely, regardless of the variations. As a result, it is possible to stably weld the first metal material 3 and the second metal material 4 with high quality, regardless of variations in plate thickness sizes of the first and second metal materials 3, 4.

Incidentally, although not illustrated, for example, a suspension tower made of die-cast aluminum in a vehicle can be adopted as the second metal material 4, and for example, a front side member made of steel in the vehicle can be adopted as the first metal material 3.

Conventionally, a self-pierce rivet (SPR) is used for joining the suspension tower (a plate material made of die-cast aluminum) and the front side member (a plate material made of steel). However, when the dissimilar metal welding method according to the invention is applied to the joining of dissimilar metal materials, for example, it is possible to omit a heat treatment that is needed when the self-pierce rivet is employed, that is, a heat treatment of a portion of the joining of the rivet and the suspension tower, and therefore, there is an advantage in terms of cost reduction.

Further, conventionally, for example, on the first metal material made of steel (ferrous metal), the newly formed surface of the first metal material is exposed simply by the plastic flow of the second metal material made of an aluminum alloy, without the contact with the pin member. In this case, it is necessary to form a plating film (for example, GA: alloyed hot-dip galvanization) on the surface of the first metal material. On the other hand, in the above embodiment, it is not necessary to form the plating film.

The invention is not limited to only the above embodiment, and can be appropriately modified within the scope of the claim and a scope equivalent to the scope of the claim.

(1) In the above embodiment, the configuration in which the second metal material 4 is overlapped on the upper surface of the first metal material 3 and the tool body 61 and the pin member 62 are moved up and down while being rotated has been described as an example, but the invention is not limited to only this configuration.

For example, the first metal material 3 and the second metal material 4 may be laterally overlapped, and the tool body 61 and the pin member 62 may be moved in the horizontal direction while being rotated. Further, the first metal material 3 and the second metal material 4 may be overlapped in another direction. Such a configuration is also included in the invention.

The invention can be suitably used for the dissimilar metal welding method of overlapping the first metal material and the second metal material composed of the metal having a lower melting point than that of the metal composing the first metal material, and performing the friction stir spot welding of the first metal material and the second metal material.

The invention claimed is:

1. A dissimilar metal welding method of overlapping a first metal material and a second metal material and performing friction stir spot welding of the first metal material and the second metal material, the second metal material being composed of a metal having a lower melting point than a melting point of a metal composing the first metal material, the dissimilar metal welding method using a welding device having a clamp, a cylindrical tool body supported by an upper-side member of the clamp in a rotatable and axially movable manner and a pin member inserted into an inner hole of the tool body in a rotatable and axially movable manner, the dissimilar metal welding method comprising:

a preparing step of causing a distal end surface of the pin member to abut against a predetermined position on a non-overlapping surface of the second metal material, by performing driving such that the distal end surface of the pin member is moved to the second metal material while the distal end surface of the pin member is rotated; and a working step of continuing the rotation and movement of the pin member, and performing driving such that a distal end surface of the tool body is moved in a direction away from the second metal material while the tool body is rotated, wherein in the working step, a through-hole is formed in the second metal material by the pin member, metal of the second metal material that plastically flows is collected in an annular space formed by an outer circumference of the pin member, the distal end surface of the tool body and an inner circumference of the upper-side member of the clamp, and then a distal end of the pin member is dug into the first metal material to a predetermined depth position in the first metal material, and wherein movements of the pin member and the tool body are stopped when at least one of a change amount of an electric current that is applied to a drive source for rotating the pin member and a change amount of an electric current that is applied to a drive source for axially moving the pin member becomes larger than a predetermined threshold in the working step.

2. A dissimilar metal welding method of overlapping a first metal material and a second metal material and performing friction stir spot welding of the first metal material and the second metal material, the second metal material being composed of a metal having a lower melting point than a melting point of a metal composing the first metal material, the dissimilar metal welding method using a welding device having a clamp, a cylindrical tool body supported by an upper-side member of the clamp in a rotatable and axially movable manner and a pin member inserted into an inner hole of the tool body in a rotatable and axially movable manner, the dissimilar metal welding method comprising:

a preparing step of causing a distal end surface of the pin member to abut against a predetermined position on a non-overlapping surface of the second metal material, by performing driving such that the distal end surface of the pin member is moved to the second metal material while the distal end surface of the pin member is rotated;

a working step of continuing the rotation and movement of the pin member, and performing driving such that a distal end surface of the tool body is moved in a direction away from the second metal material while the tool body is rotated, wherein in the working step, a through-hole is formed in the second metal material by the pin member, metal of the second metal material that plastically flows is collected in an annular space formed by an outer circumference of the pin member, the distal end surface of the tool body and an inner circumference of the upper-side member of the clamp, and then a distal end of the pin member is dug into the first metal material to a predetermined depth position in the first metal material; and a welding step of moving the pin member such that the pin member gets away from the first metal material and moving the tool body to the first metal material, after stopping the movement of the pin member and the tool body when at least one of a change amount of an electric current that is applied to a drive source for rotating the pin member and a change amount of an electric current that is applied to a drive source for axially moving the pin member becomes larger than a predetermined threshold in the working step.

* * * * *